(12) United States Patent
Kaneko

(10) Patent No.: US 7,806,135 B2
(45) Date of Patent: Oct. 5, 2010

(54) VARIABLE FLOW VALVE

(75) Inventor: Kenichiro Kaneko, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 663 days.

(21) Appl. No.: 11/822,166

(22) Filed: Jul. 3, 2007

(65) Prior Publication Data
US 2008/0017254 A1      Jan. 24, 2008

(30) Foreign Application Priority Data
Jul. 19, 2006    (JP) ............................. 2006-196948
Jan. 16, 2007    (JP) ............................. 2007-007425

(51) Int. Cl.
*F16K 24/04* (2006.01)
(52) U.S. Cl. ................... 137/202; 137/43; 137/512.5
(58) Field of Classification Search ........... 137/39, 137/43, 202, 411, 512.1, 512.5, 587, 512.2
See application file for complete search history.

(56) References Cited

U.S. PATENT DOCUMENTS 2,981,462 A * 4/1961 Niedermayer ............ 137/512.1
3,123,093 A * 3/1964 Akerman et al. ......... 137/512.1
3,375,852 A * 4/1968 Milster .................... 137/512.1
6,701,952 B1 * 3/2004 Ehrman et al. ............. 137/43
7,219,683 B2 * 5/2007 Furuya et al. .............. 137/202

FOREIGN PATENT DOCUMENTS

| JP | A-8-216707 | 8/1996 |
| JP | A-11-2348 | 1/1999 |
| JP | A-2004-100622 | 4/2004 |
| JP | A-2006-2932 | 1/2006 |

* cited by examiner

*Primary Examiner*—John Rivell
*Assistant Examiner*—Craig Price
(74) *Attorney, Agent, or Firm*—Posz Law Group, PLC

(57) ABSTRACT

A variable flow valve includes a housing, a valve element, an urging member, a first valve, a second valve, and a guide flow passage. The housing has an inlet opening, and an outlet opening. The first valve and second valve are formed between the valve element and the housing. The valve element has a separator wall. The separator wall separates the inlet opening and the outlet opening, and makes the second valve together with the housing. The guide flow passage is disposed on an inlet-opening side of the separator wall, and connects the inlet opening with the outlet opening when the separator wall moves to open the communication between the inlet opening and the outlet opening. The variable flow valve can make fluids flow without generating any turbulent flow, and can cope with the increment/decrement of required breather-gas flow volume more accurately.

9 Claims, 11 Drawing Sheets

VARIABLE FLOW VALVE

BACKGROUND OF THE INVENTION

1. Field of the Invention

The present invention relates to a variable flow valve, which is used in breather circuits for fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon, and are stored temporarily therein. Thus, the evaporator circuit inhibits the vaporized fuels from being emitted into the outside air. The canisters are connected with engines, and engines exert an inlet negative pressure to release the adsorbed vaporized fuels from activated carbon to remix them into an air-fuel mixture. Accordingly, the adsorbed vaporized fuels are reused as fuels.

However, when a fuel sucks in fresh air through a fuel supply opening in a large volume in supplying fuel to an automotive fuel tank, fuel vaporizes facilitatively in the fuel tank. Accordingly, the volume of gases flowing to the canister increases. Consequently, there might arise a problem that the adsorption amount of gases to the canister has increased. Hence, the fuel tank is provided with a breather tube which communicates the gaseous phase in the fuel tank with the outside air. The breather tube is connected with a part of an inlet pipe, part which is positioned adjacent to a fuel supply opposite opening of the inlet pipe, at one of the opposite ends. Moreover, a breather nipple, which is fixed so as to communicate with the gaseous phase in the fuel tank, is fitted into the other opposite end of the breather tube. Therefore, the vaporized fuel present within the fuel tank in supplying fuel passes the breather tube through the breather nipple, and circulates again to the fuel tank by way of the inlet pipe. Thus, the fuel is inhibited from being sucked in fresh air. In addition, it is possible to reduce the adsorption amount of vaporized fuel to the canister, because the fuel is inhibited from vaporizing.

Note that an orifice for controlling a breather gas volume is usually formed in the breather nipple so as not to increase the breather gas volume, which circulates from the breather tube to the inlet pipe, more than an air volume, which is sucked in at the fuel supply opening.

Hereinafter, the circuit of gas circulating from the fuel tank, the breather nipple, the breather tube, the inlet pipe, and again to the fuel tank in this order will be referred to as a "breather circuit."

Here, the fuel-supply rate in supplying fuel to fuel tanks can be divided into two types, a low rate represented by 15 L/min. and a fast rate represented by 38 L/min., depending on the specification and usage of fuel supply guns. Moreover, it is required to increase the breather gas volume circulating in the breather circuit in fast-rate fuel supply, because fuels suck in air more in the first-rate fuel than in the low-rate fuel supply.

In order to increase the breather gas volume circulating the breather circuit in fast-rate fuel supply, it is effective to enlarge the opening of the orifice. However, when enlarging the opening of the orifice, the breather gas volume circulating the breather circuit has increased even in low-rate fuel supply. Accordingly, the breather gas volume circulating the breather circuit has surpassed the sucked-in air volume in a low-rate fuel-supply range. Consequently, vapor leakage might occur through the fuel supply opening.

On the contrary, when diminishing the opening of the orifice, it is possible to prohibit vapor leakage in low-rate fuel supply. However, when diminishing the opening of the orifice, the volume difference has increased between the sucked-in air volume and the breather gas volume in fast-rate fuel supply. Accordingly, sucked-in fresh air facilitates the vaporization of fuel in the fuel tank. Consequently, the adsorption amount of vaporized fuel to the canister has enlarged. Under such contradicting circumstances, there might arise a problem that the conventional breather circuit cannot cope with the required increment/decrement of breather gas depending on the increment/decrement of fuel-supply rate.

As a technique for solving the problem, Japanese Unexamined Patent Publication (KOKAI) Gazette No. 8-216, 707, for instance, discloses an apparatus for prohibiting evaporating fuel gases from being emitted, apparatus which is provided with means for making an opening area variable. It also discloses to make the circulation volume of evaporating fuel gases variable depending on fuel-supply rates.

However, using the means for making an opening area variable, means which is disclosed in Japanese Unexamined Patent Publication (KOKAI) Gazette No. 8-216, 707, results in the following problem that the apparatus is susceptible to the limited on-board space. That is, in order to flow vapors in a large volume when the float valve (62) opens in FIG. 4 disclosed in the gazette, for instance, it is required to dispose a passage with a large cross-sectional area between the case (60) and the float valve (62). If such is the case, the size of the case (60) has enlarged so that the resulting apparatus suffers from the problem of limited on-board space.

Hence, Japanese Unexamined Patent Publication (KOKAI) Gazette No. 2006-2, 932 proposes a variable flow valve, which not only can precisely cope with the increment/decrement of required breather-gas flow resulting from the increment/decrement of fuel-supply rate but also can manage to offer a reduced on-board space. The variable flow valve comprises a housing, a valve element, and urging means. A first valve and a second valve are formed between the housing and the valve element. The variable flow valve copes with high-rate fuel supply and low-rate supply flexibly by means of controlling the balance between the opening/closing of the first valve and the opening/closing of the second valve.

As disclosed in Japanese Unexamined Patent Publication (KOKAI) Gazette No. 2006-2, 932, the variable flow valve has a valve element 100 as illustrated in FIG. 13. Specifically, the valve element 100 comprises a bottomed-tube-shaped cylinder 101, and a flange 102. The flange 102 protrudes radially outward from an outer peripheral surface of the cylinder 101. A spring 200, the urging means, urges the valve element 100 in such a direction that the valve element 100 goes toward the outlet opening.

During low-rate fuel supply shown in FIG. 13, gases within a fuel tank pass through the inside of the valve element 100. Then, the gases flow to the outlet opening through a clearance 301, which is formed between the valve element 100 and a housing 300.

On the other hand, during high-rate fuel supply, the gaseous pressure within the fuel tank increases, and the increasing pressure acts onto the valve element 100. Accordingly, the valve element 100 starts ascending. Then, as illustrated in FIG. 14, another clearance 302 arises between the lower base of the valve element 100's cylinder 101 and the housing 300 so that the gaseous pressure within the fuel tank acts onto the valve element 100's flange 102 as well. Consequently, the gaseous pressure pushes up the valve element 100 furthermore upward. The thus ascending valve element 100 throttles the opening area of the clearance 301. When the opening area of the clearance 301 is throttled, the pressure difference between the lower side under the valve element 100's flange 102 (i.e., the tank inner side) and the upper side above the valve element 100's flange 102 (i.e., the fuel-supply opening side) increases sharply because the atmospheric pressure acts onto the upper side above the valve element 100's flange 102. Thus, as illustrated in FIG. 15, the valve element 101 ascends instantaneously, and thereby enlarges the opening area of the clearance 302 immediately. As a result, the variable flow valve disclosed in Japanese Unexamined Patent Publication (KOKAI) Gazette No. 2006-2, 932 opens up.

Therefore, the variable flow valve disclosed in Japanese Unexamined Patent Publication (KOKAI) Gazette No. 2006-2, 932 is good in terms of the response to the changes of gaseous pressure. When the conventional variable flow valve is used in a breather circuit, it can flexibly cope with high-rate fuel supply and low-rate fuel supply. Moreover, since the first and second valves are formed between the valve element 100's flange 102 and the housing 300, it is possible to flow vapors in a great flow volume even when using the valve element 100 with small size. Therefore, the conventional variable flow valve can help engineers avoid the problem of limited on-board space.

However, the variable flow valve disclosed in Japanese Unexamined Patent Publication (KOKAI) Gazette No. 2006-2, 932, when the valve element 100 ascends to open the second valve, there occurs such a flow that fuel vapors swirl around the valve element 100's cylinder 101. Accordingly, the flow of fuel vapor is likely to be a turbulent flow. Consequently, the conventional variable flow valve might have such a drawback that it has exhibited a large ventilation pressure loss.

Moreover, Japanese Unexamined Patent Publication (KOKAI) Gazette No. 2004-100, 622 discloses a valve assembly as illustrated in FIG. 16. As shown in the drawing, the conventional valve assembly comprises a low-pressure opening valve 500, and a high-pressure opening valve 600. The low-pressure opening valve 500 and high-pressure opening valve 600 are disposed between a canister and the gaseous phase within a fuel tank. In the low-pressure opening valve 500, a ball 501 makes a valve body. The high-pressure opening valve 600 holds the low-pressure opening valve 500 therein. Upon automatically stopping fuel supply, the low-pressure opening valve 500 opens so that it is possible to decrease the pressure within the fuel tank. Note that Japanese Unexamined Patent Publication (KOKAI) Gazette No. 11-2, 348 discloses another one of such valve assemblies, which operate likewise.

However, these conventional valve assemblies might suffer from the following drawback. Namely, in order to secure a flow volume or in order to make the ventilation pressure resistance small, it is necessary to make the cross-sectional area of the flow passages when their valves are opened. As a result, the conventional valve assemblies have been large-sized so that they are disadvantageous in view of on-board space.

SUMMARY OF THE INVENTION

The present invention has been developed in view of the aforementioned circumstances. It is therefore an object of the present invention to provide a small-sized variable flow valve, which can reduce the ventilation pressure loss, and which can make fuel vapors flow in a much greater flow volume.

A variable flow valve according to the present invention can solve the aforementioned problems, and comprises:

a housing having an inlet opening through which a fluid flows thereinto, and an outlet opening through which the fluid, flowed in through the inlet opening, flows out to the outside;

a valve element disposed movably in the housing;

means for urging the valve element in such a direction that the valve element approaches the inlet opening;

a first valve formed between the valve element and the housing, and closing the communication between the inlet opening and the outlet opening as the valve element moves in such a direction that the valve element gets away from the inlet opening; and a second valve formed between the valve element and the housing, and opening the communication between the inlet opening and the outlet opening as the valve element moves in such a direction that the valve element gets away from the inlet opening;

the first valve being opened and the second valve being closed when a fluid pressure on the inlet opening side is a first predetermined value or less;

the second valve opening the communication between the inlet opening and the outlet opening instantaneously when a differential pressure between an inlet-opening-side fluid pressure and an outlet-opening-side fluid pressure is more than a second predetermined value;

the inlet opening having an imaginary inlet-opening central axis, the outlet opening having an imaginary outlet-opening central axis, the imaginary inlet-opening central axis and the imaginary outlet-opening central axis crossing with each other;

the valve element comprising a separator wall, which separates the inlet opening and the outlet opening and makes the second valve together with the housing; and the valve element further comprising a guide flow passage, which is disposed on an inlet-opening side of the separator wall and connects the inlet opening with the outlet opening when the separator wall moves to open the communication between the inlet opening and the outlet opening.

Moreover, in a first preferable mode of the present variable flow valve, the valve element and the housing can preferably comprise a rotation inhibitor, which inhibits the valve element from rotating.

In a second preferable mode of the present variable flow valve, the valve element can preferably further comprise: a cylinder-shaped portion formed on the inlet-opening side of the separator wall, and having a side wall; and an opening formed in the side wall of the cylinder-shaped portion; the opening being exposed to the outlet opening when the valve element moves in such a direction that the valve element gets away from the inlet opening, thereby forming the guide flow passage between the opening and the inside of the cylinder-shaped portion. In a furthermore preferable mode of the second preferable mode, a third preferable mode of the present variable flow valve, the opening of the valve element can preferably comprise a through hole, which is formed through the side wall of the cylinder-shaped portion of the valve element.

In a furthermore preferable mode of the second preferable mode, a fourth preferable mode of the present variable flow valve, the guide flow passage can preferably comprise a guide surface, which extends smoothly from the inlet opening to the outlet opening. Moreover, in a furthermore preferable mode of the second preferable mode, a fifth preferable mode of the present variable flow valve, the guide surface of the guide flow passage can preferably comprise a flattened section, which is formed in succession to the opening of the valve element. In addition, in a furthermore preferable mode of the second preferable mode, a sixth preferable mode of the present variable flow valve, the separator wall of the valve element can preferably comprise a communicating portion, which communicates spaces, which are disposed on both sides of the separator wall, with each other at least when the second valve is opened.

Moreover, the guide flow passage can preferably extend so as to connect the inlet opening with the outlet opening with a minimum distance. In addition, when the guide flow passage is formed, a fluid can preferably circulate in the present variable flow valve through the guide flow passage alone.

In a seventh preferable mode of the present variable flow valve, the present variable flow valve can preferably be disposed in a bent flow passage, which communicates the inside of a fuel tank with a canister. Moreover, in a furthermore preferable mode of the seventh preferable mode, an eighth preferable mode of the present variable flow valve, the present variable flow valve can preferably be disposed between the canister and a cut-off valve, which comprises a tubular body, the tubular body protruding into a gaseous phase within the fuel tank and having a vapor outlet opening at a top thereof, and a valve body, the valve body accommodated movably upward and downward in the tubular body and closing the vapor outlet opening when moving upward, wherein; the inlet opening communicates with the vapor outlet opening of the cut-off valve; and the outlet opening communicates with a flow passage of the bent flow passage, the flow passage being directed to the canister.

In accordance with the present variable flow valve, a fluid, such as a fuel vapor, which flows through the inlet opening when the second valve is opened, flows into the outlet opening by way of the guide flow passage. Accordingly, the present variable flow valve can inhibit the fluid from flowing into the other spaces. Consequently, the present variable flow valve can make the fluid flow without generating any turbulent flow. Moreover, even when the fuel-supply rate is fast excessively, the present variable flow valve can adequately secure a breather-gas flow volume. In addition, the present variable flow valve can cope with the increment/decrement of required breather-gas flow volume more accurately.

When the present variable flow valve is configured as described in the first preferable mode, the rotation inhibitor inhibits the valve element from rotating. As a result, the present variable flow valve can demonstrate the above-described advantages more securely.

When the valve element of the present variable flow valve is configured as described in the second preferable mode, the valve element comes to have a simplified construction. Accordingly, it is possible to make the valve element lightweight. Moreover, the valve element comes to have such a construction that the outer peripheral surface of the valve element's cylinder-shaped portion faces the inner peripheral surface of the housing. Consequently, the valve element is inhibited from inclining so that it exhibits improved stability upon moving. Therefore, the present variable flow valve operates with upgraded accuracy so that it can stably open and close a flow passage therein. Moreover, when the valve element's opening comprises a through hole as descried in the third preferable mode, the valve element comes to have such a construction that the cylinder-shaped portion's entire circumference, excepting the through hole, faces the housing's inner peripheral surface. As a result, the valve element can move with furthermore enhanced stability.

When the guide flow passage of the present variable flow valve is further provided with the guide surface, which guides a fluid coming into the valve element's cylinder-shaped portion, as described in the fourth preferable mode, the fluid comes to exhibit reduced fluidic resistance. Therefore, in the present variable flow valve, although the inlet opening and the outlet opening have an imaginary inlet-opening central axis and an imaginary outlet-opening central axis, respectively, which cross with each other, the present variable flow valve can make the fluid flow stably. Moreover, when the guide flow passage comprises a flattened section as described in the fifth preferable mode, the present variable flow valve can produce the advantage in an amplified manner.

Moreover, when the separator wall of the present variable flow valve is provided with a communicating portion, which communicates the spaces on both sides of the separator wall with each other at least when the second valve is opened, as described in the sixth preferable mode, a fluid, which flows by way of the communicating portion, generates a pressure difference between the spaces on the both sides of the separator wall. The resulting pressure difference suctions the valve element. Accordingly, when the second valve is opened, the valve element is inhibited from moving upward/downward. Consequently, the present variable flow valve can securely form the guide flow passage.

Note that, as described above, the present variable flow valve comprises an imaginary inlet-opening central axis and an imaginary outlet-opening central axis, which cross with each other. Accordingly, it is possible to make the overall length of the present variable flow valve such a length only that enables the valve element to move as satisfactorily as needed. Consequently, it is possible to make the present variable flow valve remarkably compact. Therefore, even when the present variable flow valve is used at the joint between a breather tube and an inlet pipe, it is possible to dispose the breather tube in proximity to the inlet tube. Thus, the present variable flow valve improves the degree of freedom in designing breather circuits greatly.

Moreover, when the present variable flow valve is disposed between a cut-off valve and a canister, the present variable flow valve can quickly decrease the pressure within a fuel tank upon automatically stopping fuel supply guns. Accordingly, the present variable flow valve can securely inhibit such a drawback that fuels blow out through fuel supply openings upon supplying or additionally supplying the fuels. Besides, it is not required to provide the present variable flow valve with an enlarged flow-passage cross-sectional area. Consequently, the present variable flow valve is advantageous in view of on-board space. In addition, when the present variable flow valve is disposed on the top of cut-off valves, the present variable flow valve can securely inhibit fuel droplets from flowing into canisters.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
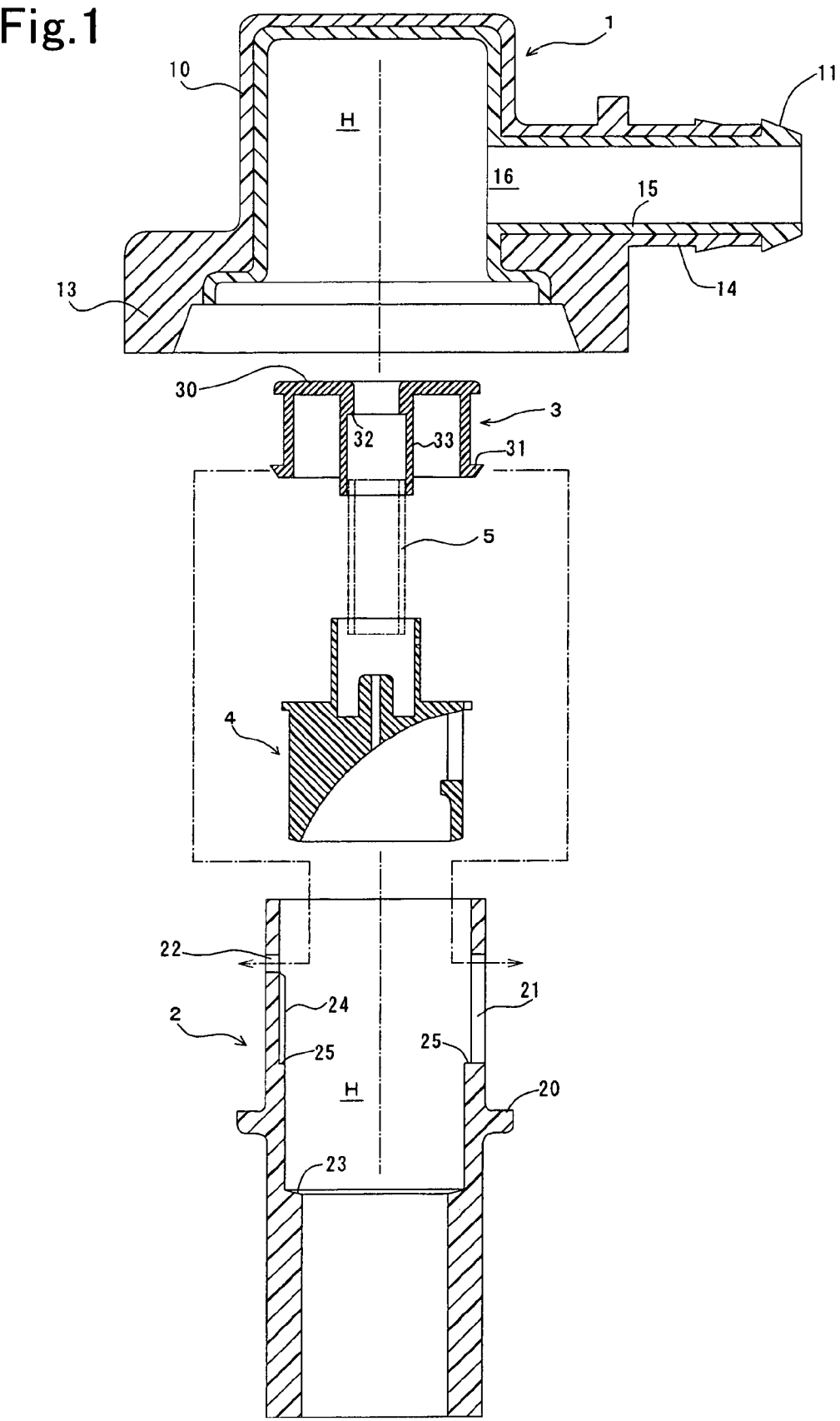
FIG. 1 is a cross-sectional view for illustrating constructions of respective parts in a variable flow valve according to Example No. 1 of the present invention.

Having generally described the present invention, a further understanding can be obtained by reference to the specific preferred embodiments which are provided herein for the purpose of illustration only and not intended to limit the scope of the appended claims.

The present variable flow valve can be applied to fluids, either liquids or gases.

The present variable flow valve comprises a housing. The housing can be fastened variously at any locations depending on the service purposes of the present variable flow valve. For example, when the present variable flow valve is applied to the breather nipple of a breather circuit, the housing is fastened air-tightly to the top of a fuel tank. In this instance, the inlet opening of the present variable flow valve communicates with a gaseous phase of fuel tank, and the outlet opening thereof communicates with a breather nipple. The housing can protrude outward out of a fuel tank. Alternatively, the housing can be disposed inside a fuel tank. Although the method of fastening the housing to a fuel tank is not limited in particular, mechanical fastening methods or adhesion or welding fastening methods are available.

When applying the present variable flow valve to the breather nipple of a breather circuit, it is preferable to provide the housing with a cylinder-shaped member, which extends into a fuel tank, at the bottom. Note that fuel tanks are provided with filled-up detection valves. When a liquid level of fuels reaches a predetermined position, a filled-up detection valve is actuated to increase the inner pressure of a fuel tank so that the increased inner pressure turns off a fuel supply gun automatically. If the bottom end of the cylinder-shaped member is positioned in the gaseous phase of the fuel tank upon detecting filled-up fuel tank, vapor leakage through the fuel supply opening occurs by way of a breather circuit even after turning off the fuel supply gun automatically. Therefore, when the bottom-end opening of the cylinder-shaped member is positioned below the liquid-level position of the filled-up fuel tank, it is possible to prohibit vapor leakage through the fuel supply opening from occurring.

The cylinder-shaped member, which extends into a fuel tank, can be integrated with the housing. However, it is preferable to air-tightly integrate a cylinder-shaped member, which is made independently of the housing, with the housing. In this way, it is possible to cope with a variety of fuel tanks whose filled-up liquid-level positions differ by simply adjusting the length of the cylinder-shaped member. Thus, a plurality of fuel tanks can share most of the housing and breather nipple.

The present variable flow valve further comprises a valve element, urging means, a first valve, and a second valve. The valve element can move freely in the housing. The urging means urges the valve element in such a direction that the valve element approaches the inlet opening. The first valve and the second valve are formed between the valve element and the housing, respectively.

The present variable flow valve operates in the following manner. When an inlet-opening-side fluid pressure is smaller than an urging force of the urging means and the valve element is disposed adjacent to the inlet opening, the first valve is opened. Accordingly, the inlet-opening-side fluid flows out through the outlet opening by way of the first valve. Moreover, as the valve element moves in such a direction that it gets away from the inlet opening depending on the enlarging inlet-opening-side fluid pressure, an opening area of the first valve narrows down gradually. Consequently, the inlet-opening-side fluid pressure enlarges all the more. When a differential pressure between an inlet-opening-side fluid pressure and an outlet-opening-side fluid pressure is more than a second predetermined value, the second valve opens up the communication between the inlet opening and the outlet opening instantaneously.

For example, when applying the present variable flow valve to the breather nipple of a breather circuit, the urging force exerted by the urging means is designed to be such an urging force that does not let the valve element float upward by a gaseous pressure within a fuel tank in low-rate fuel supply. Thus, the present variable flow valve is made to operate in the following manner. Even when the gaseous pressure within a fuel tank fluctuates in low-rate fuel supply, the first valve is kept from closing. Accordingly, it is possible to inhibit the adsorption to a canister from increasing. Moreover, when the valve element is designed to float upward by a large gaseous pressure within a fuel tank in fast-rate fuel supply, the opening area of the first valve narrows down gradually as the valve element moves in such a direction that it gets away from the inlet opening. Consequently, when the differential pressure between the inlet-opening-side gaseous pressure and the outlet-opening-side gaseous pressure is more the second predetermined value, the second valve opens up the communication between the inlet opening and the outlet opening instantaneously.

The valve element can preferably be formed as a bottomed cylinder substantially, the bottomed cylinder opening at one of the opposite ends; and the housing can preferably have a protrusion protruding toward the inlet opening. In this instance, the protrusion can be formed as a cylinder shape; and the valve element's cylinder-shaped portion can be formed as such a shape that conforms to the inner peripheral shape or outer peripheral shape of the protrusion. For example, it is preferable to form the valve element in such a construction that it is fitted outward the protrusion; and that a small hole, which is formed in the peripheral wall of the valve element, and the protrusion form the first valve. Thus, the protrusion guides the valve element so that the valve element can move stably. Moreover, the first valve is formed as the valve element moves to gradually close the small hole. The protrusion can be formed integrally with the housing. Alternatively, the protrusion can be formed independently of the housing, and can be fastened to the housing when assembling the present variable flow valve.

Moreover, the second valve is formed between the valve element and the housing, and opens the communication between the inlet opening and the outlet opening as the valve element moves in such a direction that it gets away from the inlet opening. In the present variable flow valve, the valve element is provided with a separator wall, which separates the inlet opening and the outlet opening, so that the second valve is formed between the separator wall and the housing. The second valve can be designed so as to close the communication between the inlet opening and the outlet opening when the first valve is being opened; and so as to open the communication at the moment that the valve element starts moving. However, the second valve can preferably be designed so as to open at the same time as the valve element moves by a predetermined distance to close the first valve.

The urging means can be the valve element's own weight. Alternatively, it is possible to employ springs as the urging means. The urging force of the urging means can be set up variously depending on the application or service purposes of the present variable flow valve.

One of the major characteristics of the present variable flow valve is that a guide flow passage is formed on the inlet-opening side of the separator wall when the separator wall moves to open the communication between the inlet opening and the outlet opening. The guide flow passage extends so as to connect between the inlet opening and the outlet opening with a minimum distance. The thus configured guide flow passage guides a large volume of gases, which generate in fast-rate fuel supply, to flow out through the outlet opening. Therefore, the guide flow passage inhibits the gases from flowing into the other spaces, and can flow the gases without causing turbulent flows. Moreover, when optimizing the shape of the guide flow passage as described below, it is possible to furthermore inhibit the gases from turning into turbulent flows. All in all, with the present variable flow valve, it is possible to secure a flow volume of gases sufficiently.

However, when the valve element rotates about its own central axis, the guide flow passage rotates as well. As a result, the flowing direction of gases, which the guide flow passage guides, might change to cause turbulent flows. Hence, it is preferable to provide the valve element and the housing with a rotation inhibitor, which inhibits the valve element from rotating about an imaginary inlet-opening central axis of the inlet opening. The rotation inhibitor can be a rotation-stopping mechanism, which can inhibit the rotation of the valve element alone. For example, as for the rotation inhibitor, it is possible to utilize the engagement between protrusion and dent.

Specifically, the valve element can comprise the separator wall, which is formed as inclined-plate shapes. In this instance, when a fluid pressure moves the separator wall to open the second valve, fluids are flowed along the surface of the separator wall, and are headed to the outlet opening. Thus, the guide flow passage is formed between the inlet-opening-side surface of the separator wall and the inner peripheral surface of the housing.

However, with the separator wall alone which is formed as an inclined-plate shape, there might arise fear that the valve element moves unstably, that is, the valve element inclines upon moving. Hence, it is preferable to provide the valve element with a cylinder-shaped portion and an opening. The cylinder-shaped portion is formed on the inlet-opening-side of the separator wall. The opening is formed in a side wall of the cylinder-shaped portion. When the thus configured valve element moves in such a direction that it gets away from the inlet opening, the opening is exposed to form the guide flow passage between the opening and the inside of the cylinder-shaped portion. Moreover, when the valve element moves, the inner peripheral surface of the housing guides the outer peripheral surface of the cylinder-shaped portion. As a result, the valve element can move with enhanced stability.

When configuring the valve element as described above, a cut-off opening, which is formed in a side wall of the cylinder-shaped portion, can make the opening. Alternatively, a through hole, which is formed in a side wall of the cylinder-shaped portion, can make the opening. When a through hole makes the opening, the cylinder-shaped portion's entire circumference, excepting the through hole, faces the housing's inner peripheral surface. As a result, the valve element can move with more enhanced stability.

Moreover, the guide flow passage can preferably be provided with a guide surface, which extends smoothly from the inlet opening to the outlet opening. For example, it is preferable to form a curved surface, which connects between the cylinder-shaped portion and opening of the valve element smoothly, in a surface of the separator wall, and then to let the resulting curved surface make the guide surface. However, since the outlet opening's imaginary outlet-opening central axis and the inlet opening's imaginary inlet-opening central axis cross with each other, the cylinder-shaped portion's imaginary central axis and the opening's imaginary central axis also cross with each other. Accordingly, fluids first flow along the cylinder-shaped portion's inner peripheral surface, then collide with the guide surface and thereafter change the flowing direction while being guided by the guide surface, and eventually flow to the outlet opening through the opening. Consequently, when a curved surface makes the guide surface, the fluids might turn into turbulent flows upon colliding with the guide surface to cause ventilation pressure loss.

Hence, it is preferable to provide the guide surface with a flattened section, which is formed in succession to the valve element's opening. With such an arrangement, fluids, which enter the valve element's cylinder-shaped portion, are headed to the flattened section after colliding with the guide surface, then converge at the flattened section, and eventually are headed to the opening. Thus, it is possible to furthermore inhibit the fluids from turning into turbulent flows when they collide with the guide surface.

Moreover, it is preferable to provide the separator wall with a communicating portion, which communicates spaces, which are disposed on both sides of the separator wall, with each other at least when the second valve is opened. If such is the case, the pressure of fluids, which flow in the communicating portion, further enlarges the pressure difference between the pressures on both sides of the separator wall. The resulting pressure difference suctions the valve element. Accordingly, the valve element can move in a more facilitated manner so that it exhibits upgraded responsivity. Moreover, the resultant pressure difference acts on the entire surface of the separator wall. Consequently, the valve element is inhibited from inclining so that it can move with more enhanced stability.

EXAMPLES

The present variable flow valve will be hereinafter described in more detail with reference to specific examples.

Example No. 1

Figure 2:
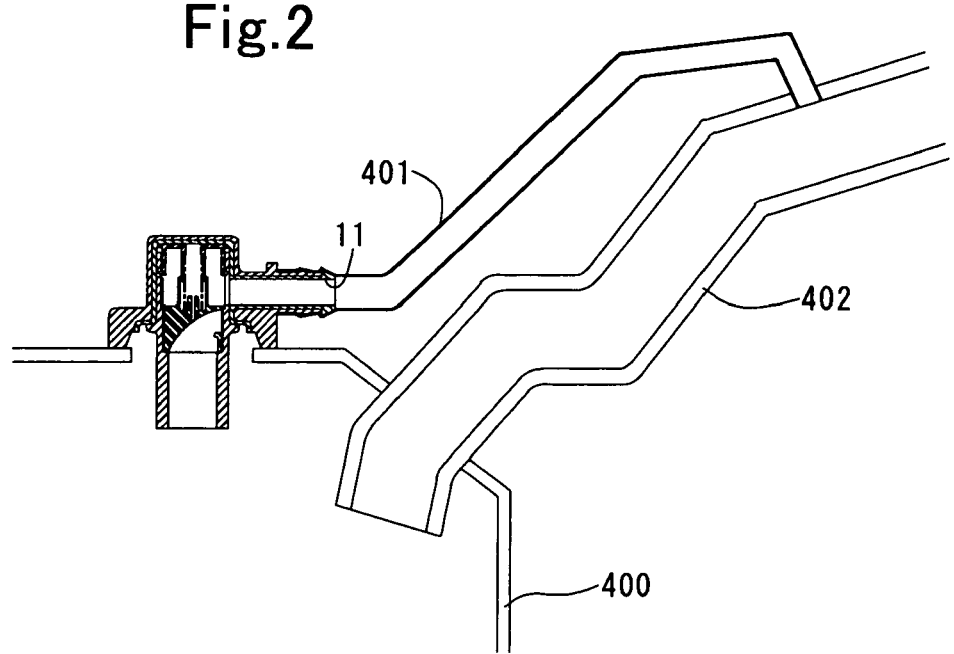
FIG. 2 is an explanatory diagram for illustrating a breather circuit which is equipped with the variable flow valve according to Example No. 1.
Figure 5:
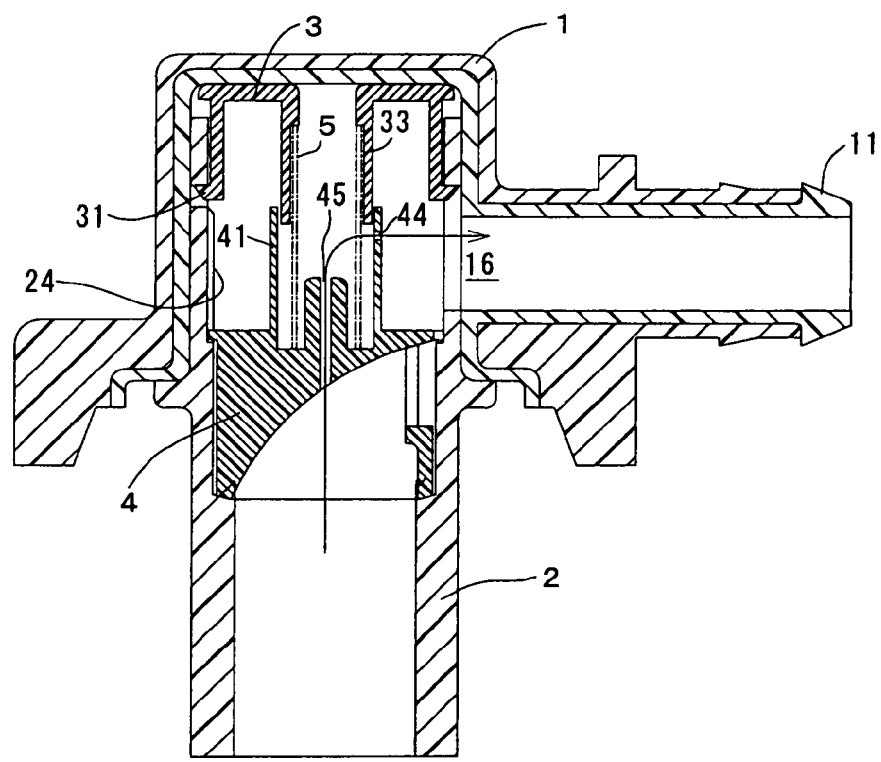
FIG. 5 is a cross-sectional view for illustrating an operation of the variable flow valve according to Example No. 1 upon low-rate fuel supply.
Figure 6:
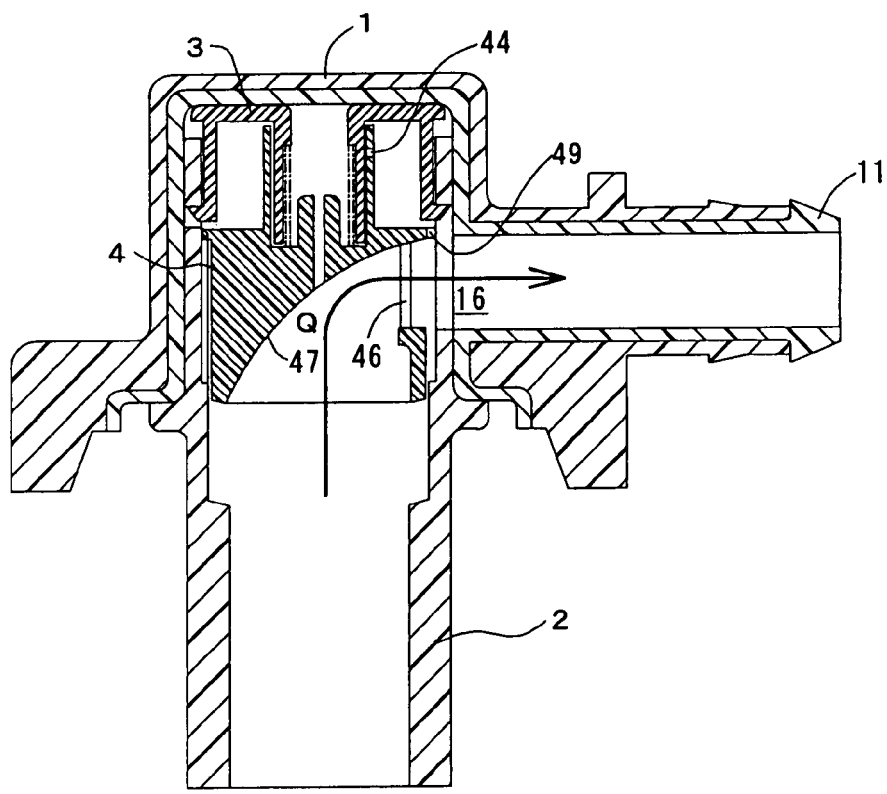
FIG. 6 is another cross-sectional view for illustrating another operation of the variable flow valve according to Example No. 1 upon fast-rate fuel supply.

FIG. 1 shows a cross-sectional view for each of the component parts of a variable flow valve according to Example No. 1 of the present invention. FIGS. 5 and 6 show cross-sectional views of the variable flow control valve according to Example No. 1 after being assembled. As illustrated in FIG. 2, the variable flow valve according to Example No. 1 is fixed to a top of a fuel tank 400 by welding. The variable flow valve according to Example No. 1 comprises a nipple 11, which is fitted into a breather tube 401. The breather tube 401 is connected with a part of an inlet pipe 402, part which is positioned adjacent to a fuel supply opposite opening of the inlet pipe 402.

As shown in FIG. 1, the variable flow valve according to Example No. 1 of the present invention comprises a cover 1, a cylinder-shaped member 2, a seat plate 3, a valve element 4, and a spring 5. The cover 1 is manufactured by two-color molding. Note that the cylinder-shaped member 2 is fixed to the cover 1 by welding. The cover 1, the cylinder-shaped member 2, and the seat plate 3 make the claimed housing according to the present variable flow valve.

The cover 1 comprises a bottomed receptacle 10, the nipple 11, and a ring-shaped disk 13. The receptacle 10 is formed as a bottomed cylinder shaped, and has a peripheral wall. The nipple 11 protrudes radially outward from the peripheral wall of the receptacle 10. The disk 13 is formed around the opening periphery of the receptacle 10. The receptacle 10 and nipple 11 are formed of an outer layer 14, made of modified polyethylene, and an inner layer 15, made of polyamide. The disk 13 is formed of the same modified polyethylene as that of the outer layer 14. Moreover, the peripheral wall of the receptacle 10 is provided with an outlet opening 16, which communicates with the nipple 11.

The cylinder-shaped member 2 is formed of polyamide, and comprises a flange 20, which is disposed on an outer peripheral surface thereof. When the cylinder-shaped member 2's top is engaged with the cover 1's receptacle 10; and when the cylinder-shaped member 2's flange 20 is welded to the receptacle 10's inner layer 15, the cylinder-shaped member 2 and cover 1 are made integral. Thus, a housing "H" is formed inside the cover 1. Further, a gas outlet hole 21 penetrates through the cylinder-shaped member 2's peripheral wall, and communicates with the outlet opening 16 and nipple 11. Furthermore, the cylinder-shaped member 2's top peripheral wall is provided with a plurality of engagement holes 22, and the cylinder-shaped member 2's inner peripheral surface is provided with a ring-shaped valve seat 23. Moreover, the cylinder-shaped member 2's top inner peripheral wall, which faces the gas outlet hole 21, is provided with a guide rib 24, which extends in the up/down direction.

The seat plate 3 comprises a disk-shaped base 30, a plurality of engagement claws 31, and an inner cylinder 33; and is formed of polyacetal resin. The engagement claws 31 are disposed one after another at predetermined intervals on the base 30's bottom rim. The inner cylinder 33 is disposed about the base 30's center, protrudes axially downward, and has a step 32 at the top of the inner periphery. When the engagement claws 31 engage with the cylinder-shaped member 2's engagement holes 22, the seat plate 3 is fastened to the cylinder-shaped member 2. The outside diameter of the inner cylinder 33 is smaller than the inside diameter of the valve element 4's top cylinder. The inner cylinder 33 guides the valve element 4 so that the valve element 4 can move freely in the up/down direction.

Figure 3:
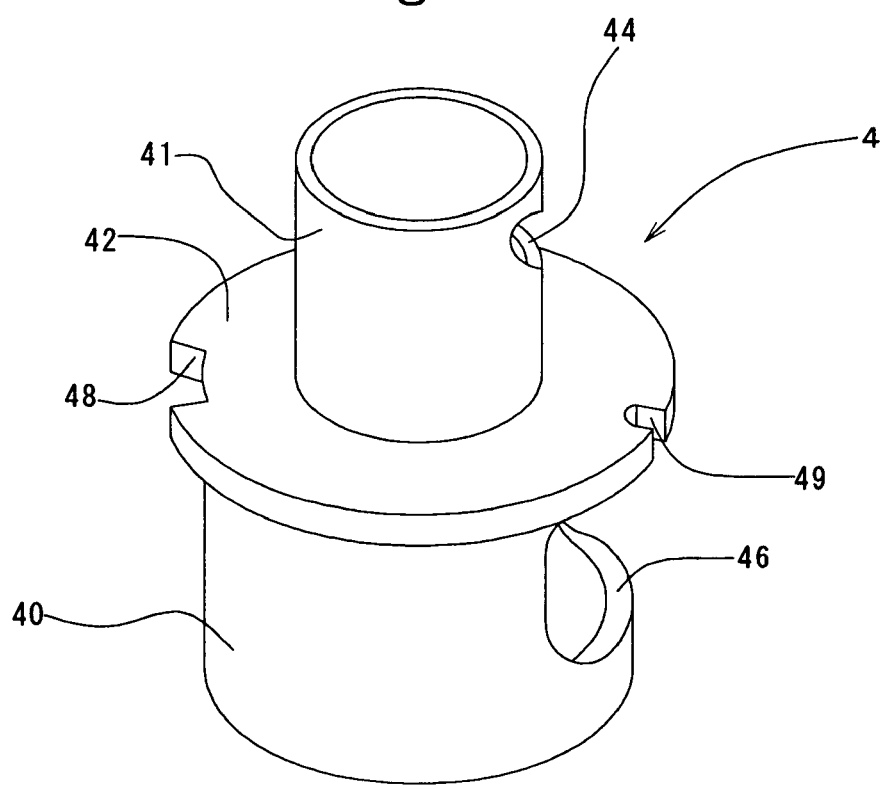
FIG. 3 is a perspective view for illustrating a valve element, which is used for the variable flow valve according to Example No. 1.
Figure 4:
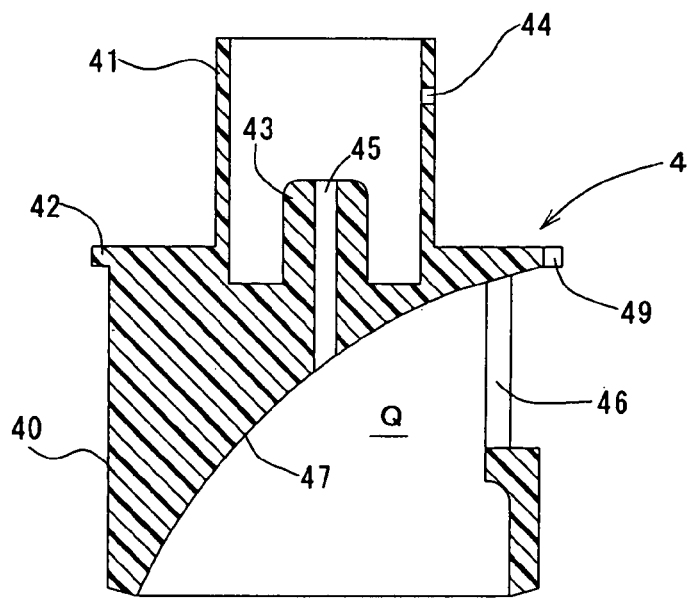
FIG. 4 is a cross-sectional view for illustrating the valve element, which is used for the variable flow valve according to Example No. 1.

FIG. 3 illustrates a perspective view of the valve element 4. FIG. 4 illustrates a cross-sectional view of the valve element 4. As shown in the drawings, the valve element 4 comprises a cylinder-shaped portion 40, a top cylinder-shaped portion 41, and a flange-shaped separator wall 42, and an inner cylinder-shaped portion 43; and is formed of polyacetal resin. The cylinder-shaped portion 40 is formed as a bottomed cylinder shape, which extends downward. The top cylinder-shaped portion 41 is disposed on the top of the cylinder-shaped portion 40, and extends upward therefrom. The separator wall 42 demarcates the cylinder-shaped portion 40 with the top cylinder-shaped portion 41. As shown in FIG. 4, the inner cylinder-shaped portion 43 is disposed inside the top cylinder-shaped portion 41, and is formed coaxially therewith.

As shown in FIGS. 3 and 4, a small hole 44 penetrates through the top cylinder-shaped portion 41's peripheral wall. Further, a central hole 45 penetrates axially through the inner cylinder-shaped portion 43. Thus, the inside of the cylinder-shaped portion 40 communicates with the inside of the top cylinder-shaped portion 41 by way of the central hole 45. Furthermore, the cylinder-shaped portion 40's peripheral wall is provided with an opening 46, which comprises a through hole with substantially the same size as that of the outlet opening 16. Moreover, one of the opposite surfaces of the separator wall 42, that is, the opposite surface which is disposed on the cylinder-shaped portion 40's side, is provided with a cross-sectionally arc-shaped guide surface 47, which connects the cylinder-shaped portion 40's leading-end opening (or bottom-end opening) with the opening 46 smoothly. Thus, as shown in FIG. 4, a guide flow passage "Q" is formed between the cylinder-shaped portion 40's inside and the opening 46.

As shown in FIG. 3, the separator wall 42's outer rim is provided with a guide groove 48, which is disposed on the opposite side with respect to the cylinder-shaped portion 40's opening 46 and which penetrates through the separator wall 42 in the up/down direction. The guide groove 48 couples with the cylinder-shaped member 2's guide rib 24. Specifically, the valve element 4 can not only move in the up/down direction while being guided by the cylinder-shaped member 2's guide rib 24, but also is inhibited from rotating when the guide groove 48's opposite peripheral end surfaces contact with the guide rib 24. Moreover, a part of the separator wall 42's outer rim is provided with a cut-off communicating portion 49, which penetrates through the separator wall 42 in the up/down direction.

As can be seen from FIG. 2, in the variable flow valve according to Example No. 1 of the present invention, the cover 1 covers an opening, which is formed in the fuel tank 400's top surface; the cover 1's annular disk 13 is fixed to the opening's peripheral rim by welding; and the bottom end of the cylinder-shaped member 2 is positioned in the gaseous phase within the fuel tank 400.

The valve element 4 is disposed inside the cylinder-shaped member 2 coaxially therewith, and is disposed movably in the up/down direction. The spring 5 intervenes between the seat plate 3 and the valve element 4. The spring 5 urges the valve element 4 downward with a weak spring force. Under the ordinary conditions, the bottom end surface of the valve element 4's cylinder-shaped portion 40 contacts with the cylinder-shaped member 2's valve seat 23. Moreover, the outer peripheral bottom surface of the valve element 4's separator wall 42 contacts with a step 25, which is formed on the cylinder-shaped member 2's inner peripheral surface as shown in FIG. 1.

Moreover, under the ordinary conditions, the seat plate 3's inner cylinder 33 is fitted into the valve element 4's top cylinder-shaped portion 41 coaxially therewith. Thus, as illustrated in FIG. 5, although the leading end (or top end) of the valve element 4's top cylinder-shaped portion 41 overlaps with the leading end (or bottom end) of the seat plate 3's inner cylinder 33, the cylinder-shaped portion 41's small hole 44 does not overlap with the inner cylinder 33.

Therefore, in the variable flow valve according to Example No. 1 of the present invention during low-rate fuel supply, gases within the fuel tank 400 flow in the following manner; as shown in FIG. 5, the gases enter the valve element 4's top cylinder-shaped portion 41 from the cylinder-shaped member 2 via the central hole 45 of the valve element 4's inner cylinder-shaped portion 43; then vent out of the small hole 44 of the valve element 4's top cylinder-shaped portion 41; and are eventually discharged through the outlet opening 16 and nipple 11. The gases turn into a breather gas, and circulate from the nipple 11 throughout the breather tube 401 and inlet pipe 402. In this instance, the gaseous pressure within the fuel tank 400, which is exerted onto the valve element 4, acts onto the valve element 4's guide surface 47 especially. However, the valve element 4 does not move, because the sum of the spring 5's urging force and the valve element 4's own weight is greater than the force, which the guide surface 47 receives.

On the other hand, in the variable flow valve according to Example No. 1 of the present invention during fast-rate fuel supply illustrated in FIG. 6, the gaseous pressure within the fuel tank 400 increases, and the increasing gaseous pressure acts onto the valve element 4. Accordingly, the valve element 4 starts moving in such a direction that it approaches the seat plate 3. Then, the valve element 4's small hole 44 overlaps with the seat plate 3's inner cylinder 33, and thereby the small hole 44's opening area is throttled. When the small hole 44 is covered with the inner cylinder 33 completely, the top surface of the valve element 4's separator wall 42 coincides with the bottom side of the outlet opening 16's inner peripheral surface.

Then, the pressure difference between the upper side above the valve element 4's separator wall 42 (or the side of the nipple 11) and the lower side below the separator wall 42 (or the inside of the fuel tank) increases rapidly, because the former is subjected to an atmospheric pressure. Accordingly, the valve element 4 ascends instantaneously. Consequently, the opening area of the valve element 4's opening 46 enlarges instantaneously. Specifically, in the variable flow valve according to Example No. 1 of the present invention, the valve element 4's small hole 44 and the seat plate 3's inner cylinder 33 make the claimed first valve, and the valve element 4's opening 46 and the cylinder-shaped member 2 make the claimed second valve.

The high-pressure gases within the fuel tank 400 first collide with the valve element 4's guide surface 47, and then are guided to the valve element 4's opening 46 by the guide surface 47, which continues smoothly to the opening 46. Therefore, the high-pressure gases are inhibited from turning into turbulent flows so that the ventilation pressure loss is less likely to occur. Thus, the variable flow valve according to Example No. 1 of the present invention can secure a high breather-gas flow volume.

Moreover, when the valve element 4 ascends, the valve element 4's guide groove 48 couples with the cylinder-shaped member 2's guide rib 24 to inhibit the valve element 4 from rotating. In addition, the valve element 4 ascends while the cylinder 40's outer peripheral surface is guided by the cylinder-shaped member 2's inner peripheral surface over the entire circumference. Accordingly, the positional relationship between the valve element 4's opening 46 and the outlet opening 16 does not change at all in the peripheral direction. Consequently, the variable flow valve according to Example No. 1 of the present invention can stably discharge the gases within the fuel tank 400 to the nipple 11 in a large flow volume.

In addition, the communicating portion 49, which is formed in the valve element 4, communicates the upper space above the separator wall 42 and the lower space below the separator wall 42. Moreover, the communicating portion 49's lower-end opening is exposed in the guide surface 47. Therefore, the flow of gases, which flow at large flow rates along the guide surface 47, generates a negative pressure within the upper space above the separator wall 42. The resulting negative pressure suctions the valve element 4 upward. Accordingly, the valve element 4 is inhibited from vibrating up and down. Consequently, the variable flow valve according to Example No. 1 of the present invention can securely form the guide flow passage "Q" therein.

The variable flow valve according to Example No. 1 of the present invention can accurately cope with the increment/decrement of required breather-gas flow volume, because it functions as described above to operate the valve element 4 with upgraded stability.

Upon low-rate fuel supply or finishing fuel supply, the urging force of the spring 5 moves the valve element 4 downward to return it back to the position shown in FIG. 5.

Specifically, the variable flow valve according to Example No. 1 of the present invention is good in terms of the followability with respect to the increment/decrement of fuel supply rate, and accordingly can instantaneously increase or decrease the breather-gas flow volume. Therefore, the variable flow valve according to Example No. 1 can inhibit excessive gases from flowing into canisters, and can inhibit vapor leakage from taking place.

Example No. 2

Figure 7:
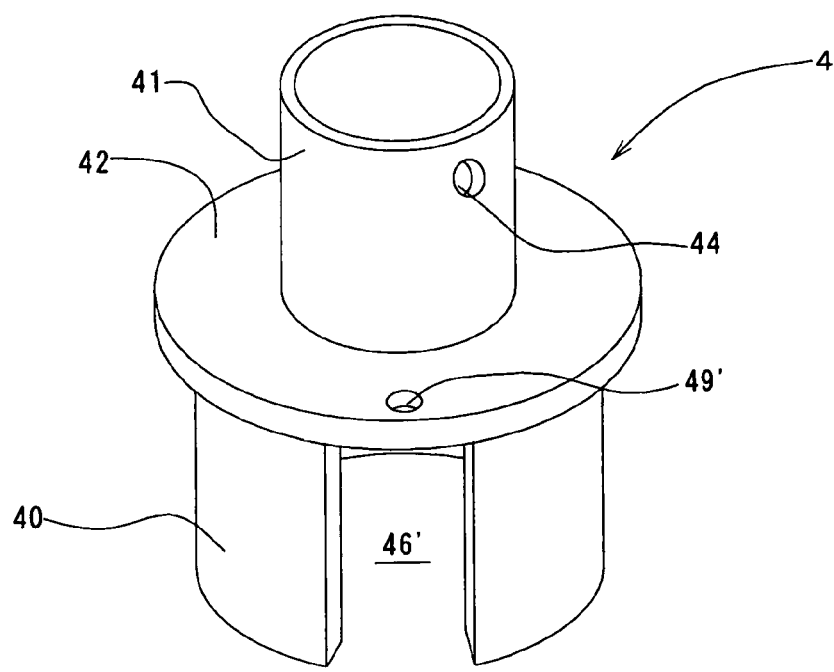
FIG. 7 is a perspective view for illustrating a valve element, which is used for a variable flow valve according to Example No. 2 of the present invention.
Figure 8:
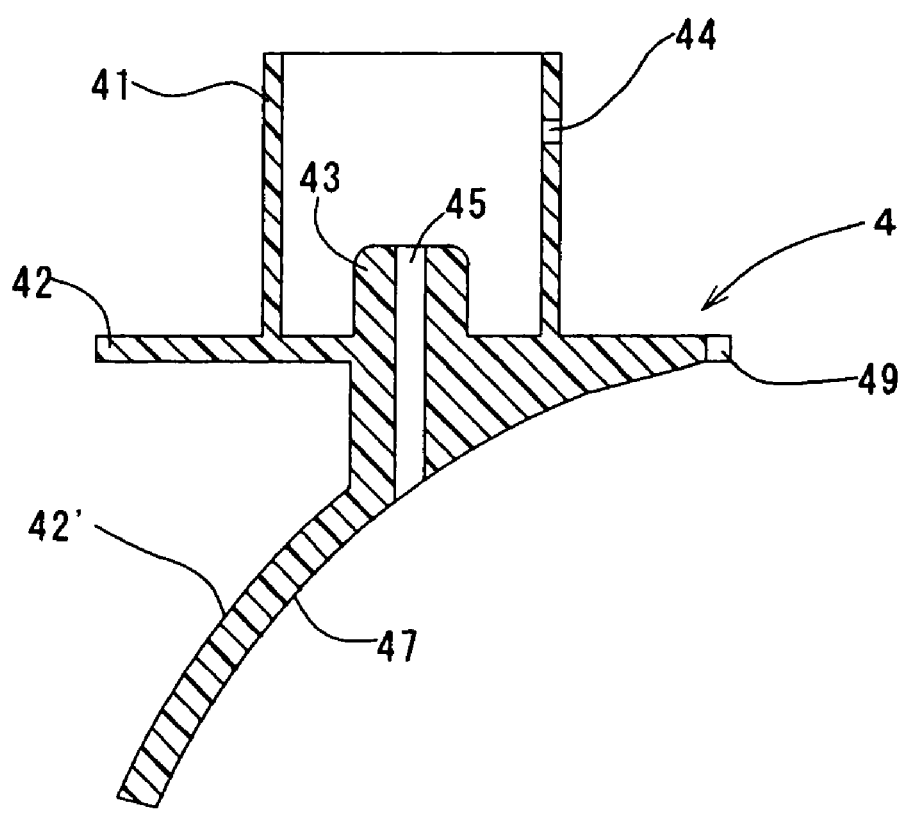
FIG. 8 is a cross-sectional view for illustrating a valve element, which is used for a variable flow valve according to Example No. 3 of the present invention.

Except that the valve element 4 is formed differently from that of the variable flow valve according to Example No. 1 of the present invention, a variable flow valve according to Example No. 2 comprises the same component parts as those of the variable flow valve according to Example No. 1. Specifically, in the variable flow valve according to Example No. 2, the valve element 4's cylinder 40 is provided with a slit-shaped opening 46', as illustrated in FIG. 7, instead of the through-holed opening 46. Moreover, a part of the valve element 4's separator wall 42 is provided with a through-holed communicating portion 49', as shown in the drawing, instead of the cut-off communicating portion 49.

In the thus configured valve element 4, although the cylinder-shaped portion 40's lower end is cut off partially by the slit-shaped opening 46', most of the entire circumference is left as it is. As a result, the valve element 4 ascends while the cylinder-shaped portion 40's outer peripheral is guided by the cylinder-shaped member 2's inner peripheral surface. Accordingly, the positional relationship between the valve element 4's slit-shaped opening 46' and the outlet opening 16 does not change at all in the peripheral direction. Consequently, the variable flow valve according to Example No. 2 of the present invention can stably discharge the gases within the fuel tank 400 to the nipple 11 in a large flow volume.

Example No. 3

Except that the valve element 4 is formed differently from that of the variable flow valve according to Example No. 1 of the present invention, a variable flow valve according to Example No. 3 also comprises the same component parts as those of the variable flow valve according to Example No. 1. Specifically, in the variable flow valve according to Example No. 3, the valve element 4 is free of the cylinder-shaped portion 40, but is provided with a swash-plate-shaped guide wall 42'. The thus configured valve element 4 forms the guide flow passage "Q" between the inlet-opening-side surface of the swash-plate-shaped guide wall 42' and the inner peripheral surfaces of the cylinder-shaped member 2 and cover 1.

Example No. 4

In the above-described variable flow valve according to Example No. 1 of the present invention, the valve element 4's guide surface 47 has an identical arc-shaped curved superficial configuration in all of the cross sections. However, the cross section of gases, which flow in the cylinder-shaped member 2 and the valve element 4's cylinder-shaped portion 4, is circular. Note that the flow of the gases is bent at the guide surface 47 substantially perpendicularly. Accordingly, the flow of the gases might turn into turbulent flows when it collides with the guide surface 47. Consequently, the flow of the gases might cause ventilation pressure losses.

Figure 9:
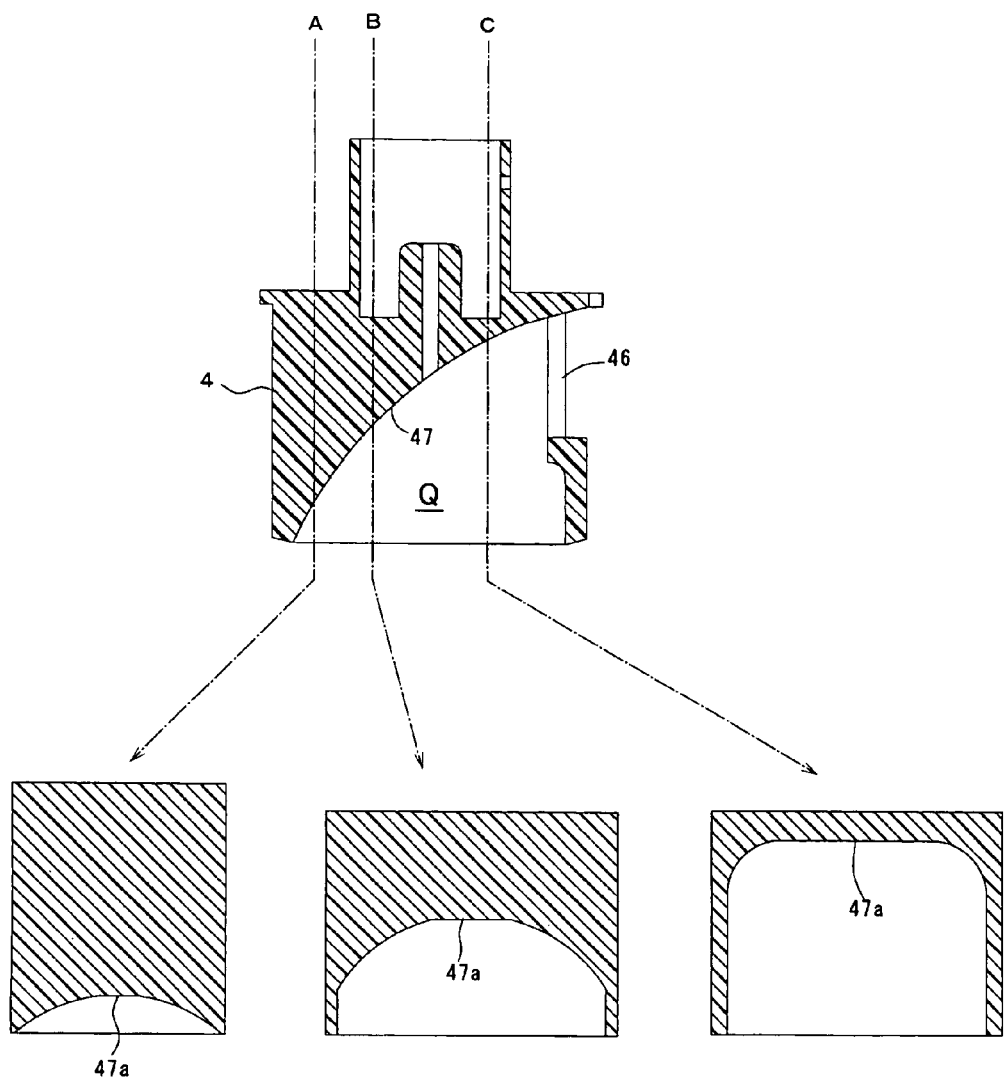
FIG. 9 is a cross-sectional view for illustrating a valve element, which is used for a variable flow valve according to Example No. 3 of the present invention.

Hence, a variable flow valve according to Example No. 4 of the present invention comprises the guide surface 47 whose configuration is elaborated as hereinafter described. For example, as illustrated in FIG. 9, the guide surface 47 is provided with a minor flattened section 47a at a position away from the opening 46 (e.g., at the position being designated with the cross section "A" in the drawing); and the flattened section 47a enlarges gradually, as shown in the drawing, as the guide flow passage "Q" approaches the opening 46. In other words, the guide surface 47 is provided with a flattened section 47a, which enlarges as it is headed to the opening 46's inner peripheral surface.

With the thus configured valve element 4, gases, which flow in the cylinder-shaped member 2 and the valve element 4's cylinder-shaped portion 40, flow while being guided by and converged at the flat surface 47's flattened section 47a. As a result, the valve element 4 inhibits the flow of the gases from turning into turbulent flows. All in all, the variable flow valve according to Example No. 4 of the present invention can more securely inhibit the flow of the gases from causing ventilation pressure losses.

Example No. 5

Figure 10:
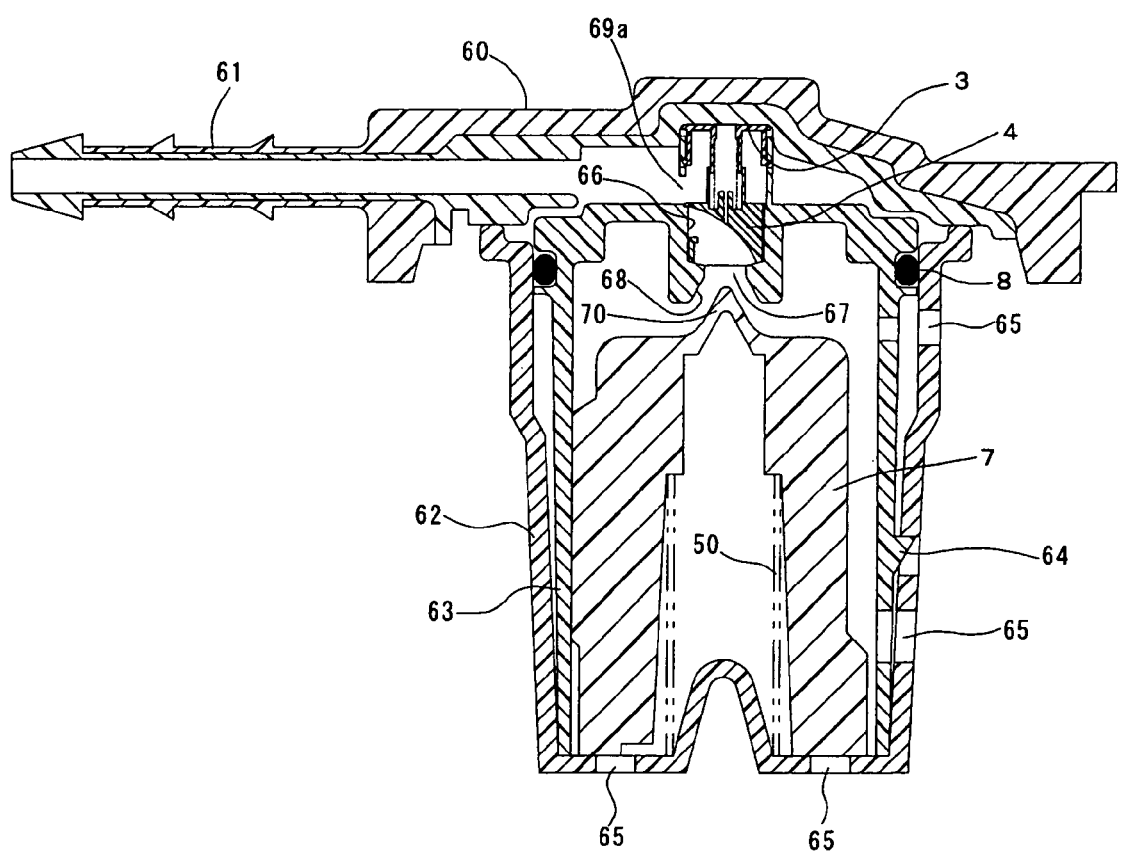
FIG. 10 is a cross-sectional view for illustrating a cut-off valve in which a variable flow valve according to Example No. 5 of the present invention is disposed.
Figure 11:
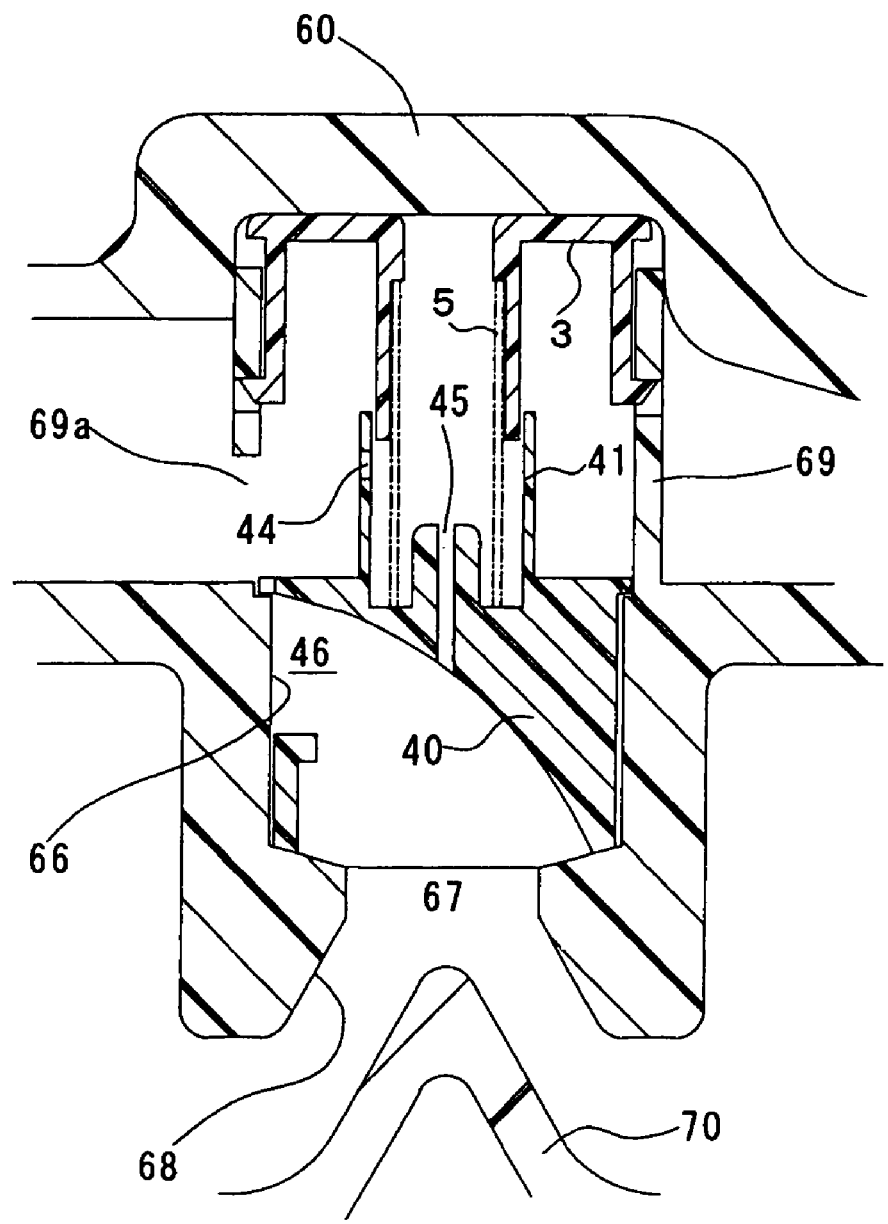
FIG. 11 is an enlarged cross-sectional view for illustrating a major part of the cut-off valve in which the variable flow valve according to Example No. 5 is disposed.

A variable flow valve according to Example No. 5 of the present invention relates to a valve assembly in which one of the variable flow valves according to Example Nos. 1 through 4 is disposed between a cut-off valve and a canister as illustrated in FIGS. 10 and 11. The valve assembly is disposed at the top of a fuel tank, which is equipped with a not-shown filled-up detection valve.

As illustrated in FIG. 10, the cut-off valve comprises a nipple 61, a cover 60, a first bottomed-cylinder-shaped body 62, a second bottomed-cylinder-shaped body 63, and a valve body 7. The nipple 61 is connected with a tube, which communicates with a canister. The cover 60 has a bottom end surface, which is welded to a fuel tank in an annular manner. The first bottomed-cylinder-shaped body 62 has an opened rim, which is bonded to the cover 60 by welding. The second bottomed-cylinder-shaped body 63 is disposed within the first bottomed-cylinder-shaped body 62 in such a manner that the bottom faces upward. The valve body 7 is disposed movably in the up/down direction within the second bottomed-cylinder-shaped body 63.

The second bottomed-cylinder-shaped body 63 is coupled with the first bottomed-cylinder-shaped body 62 by a claw 64, and is retained thereto. Moreover, an O-ring 8 intervenes between the first bottomed-cylinder-shaped body 62's inner peripheral surface and the second bottomed-cylinder-shaped body 63's outer peripheral surface. Thus, the first bottomed-cylinder-shaped body 62 and the second bottomed-cylinder-shaped body 63 are integrated air-tightly. In addition, the first bottomed-cylinder-shaped body 62 and second bottomed-cylinder-shaped body 63 are provided with a plurality of communicating holes 65, which communicate the inside with the outside.

The center of the second bottomed-cylinder-shaped body 63's upper base is provide with a boss, which protrudes downward. In the boss, there is formed a concave 66, which is dented downward. The concave 66's bottom is provided with a vapor outlet opening 67. The vapor outlet opening 67 communicates the inside of the second bottomed-cylinder-shaped body 63 with the cover 60 and nipple 61. Moreover, the vapor outlet opening 67 also communicates the inside of the second bottomed-cylinder-shaped body 63 with the gaseous phase within the fuel tank by way of the communicating holes 65. Note that the valve body 7 comprises a float valve. A spring 50 urges the valve body 7 upward. The valve body 7's top end is provided with a valve protrusion 70. The vapor outlet opening 67 is provided with a valve-seating surface 68, with which the valve protrusion 67 contacts when the valve body 7 floats upward.

Moreover, as illustrated in FIGS. 10 and 11, the valve element 4, which is constructed in the same manner as that of the variable flow valve according to Example No. 1 of the present invention, for instance, is accommodated in the concave 66, which is formed in the second bottomed-cylinder-shaped body 63's upper base. In addition, as better shown in FIG. 11, the second bottomed-cylinder-shaped body 63's upper base is further provided with a cylinder 69, which protrudes from the concave 66's rim to the cover 60. The seat plate 3, which is constructed in the same as manner that of the variable flow valve according to Example No. 1, for instance, is retained to the leading or top end of the cylinder 69. The cylinder 69 is provided with an opening 69a, which is disposed coaxially with the nipple 61. When the valve element 4 ascends, the valve element 4's opening 46 and the cylinder 69's opening 69a are disposed coaxially with each other.

Under ordinary conditions, gases within the fuel tank flow into the second bottomed-cylinder-shaped cylinder 63 through the communicating holes 65. Then, the gases flow into the valve element 4's cylinder-shaped portion 40 via the second bottomed-cylinder body 63's vapor outlet opening 67. Eventually, the gases flow into the canister through the nipple 61 by way of the valve element 4's central hole 45, the small hole 44 of the valve element 4's top cylinder-shaped portion 41 and the cylinder 69's opening 69a. Thus, the valve assembly according to Example No. 5 of the present invention inhibits the fuel tank's internal pressure from increasing.

On the other hand, when a vehicle body inclines or vibrates so that a liquid fuel flows into the second bottomed-cylinder-shaped 63 through the communicating holes 65, the valve body 7 floats upward so that the valve protrusion 70 contacts with the valve-seating surface 68 to seal the vapor outlet opening 67. Thus, the valve assembly according to Example No. 5 of the present invention inhibits the liquid fuel from flowing into the canister. Moreover, even when the droplets of the liquid fuel goes into the vapor outlet opening 67, it is less likely that the droplets go into the valve element 4's central hole 45 because the valve element 4 is present within the concave 66. Moreover, even if the droplets should have gone into the central hole 45, it is more unlikely that the droplets go into the valve element 4's small hole 44 because the central hole 45's imaginary central axis and the small hole 44's imaginary central axis cross with each other substantially perpendicularly. Therefore, the valve assembly according to Example No. 5 can securely inhibit the liquid fuel or even the droplets thereof from going into the canister.

Figure 16:
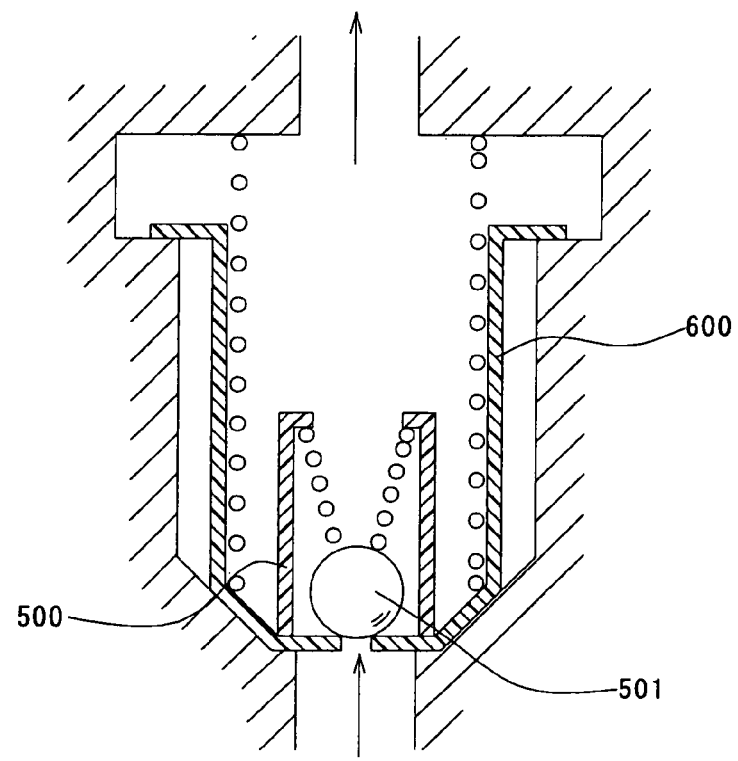
FIG. 16 is a cross-sectional view for illustrating a conventional cut-off valve assembly.

Next, the relationship between the change of internal pressure within the fuel tank and the change of liquid level within the filler pipe immediately after automatically stopping a fuel supply gun will be hereinafter described with reference to FIG. 12. In the drawing, the conventional valve assembly, which is disclosed in Japanese Unexamined Patent Publication (KOKAI) Gazette No. 2004-100, 622 and is illustrated in FIG. 16, is labeled "Comparative Example." Note that it is assumed hereinafter that, until a fuel supply gun is turned off automatically, the valve element 4 of the valve assembly according to Example No. 5 of the present invention and the low-pressure-opening valve 500 of the conventional valve assembly according to Comparative Example have been opened.

Figure 12:
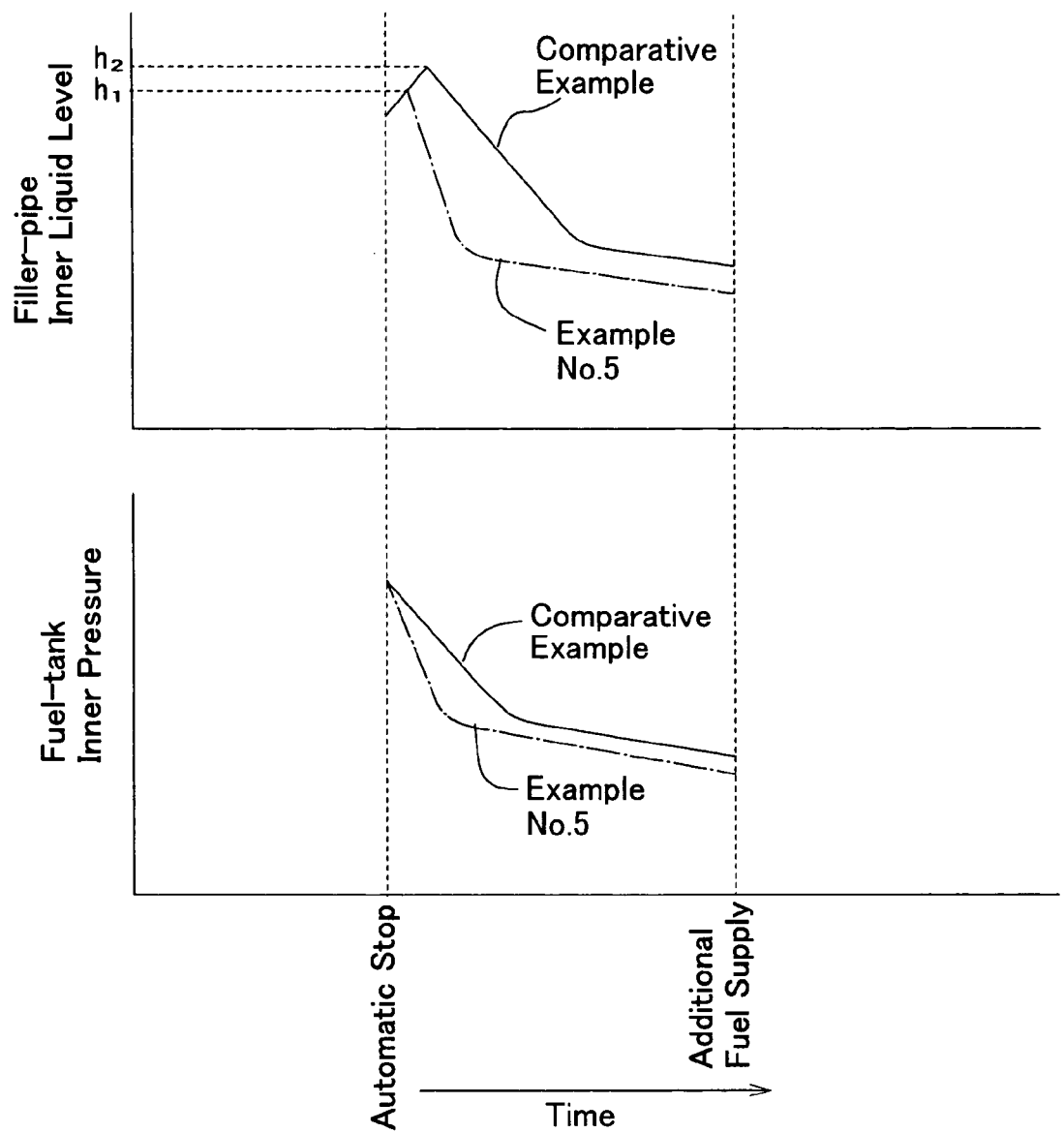
FIG. 12 is a graph for illustrating the change of fuel-tank inner pressure with time and the change of filler-pipe inner liquid level with time upon additionally supplying a fuel.
Figure 13:
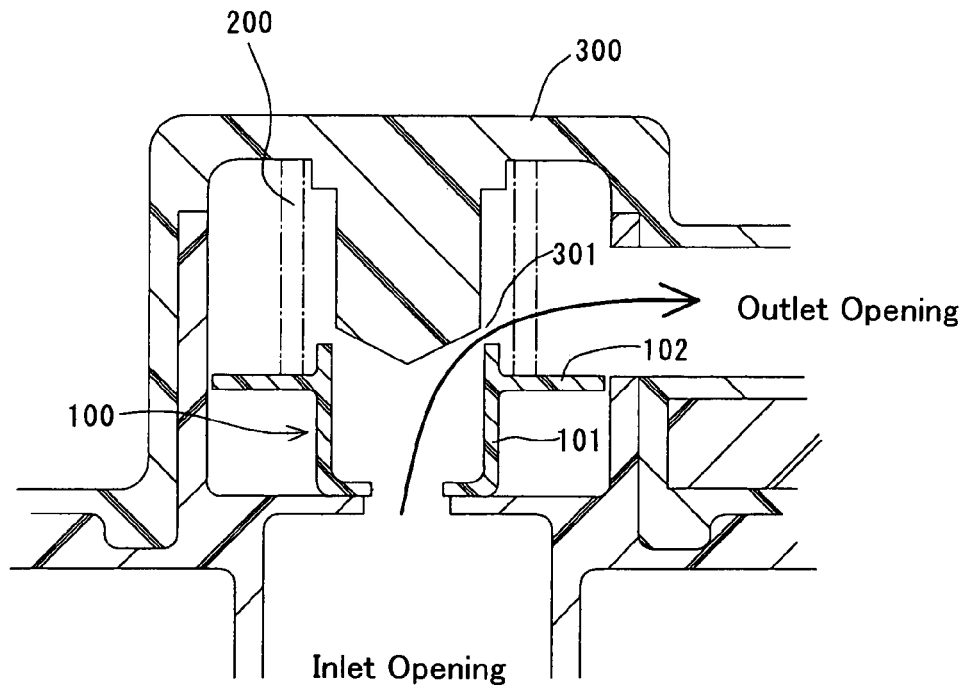
FIG. 13 is an enlarged cross-sectional view for illustrating a major part of a conventional variable flow valve.
Figure 14:
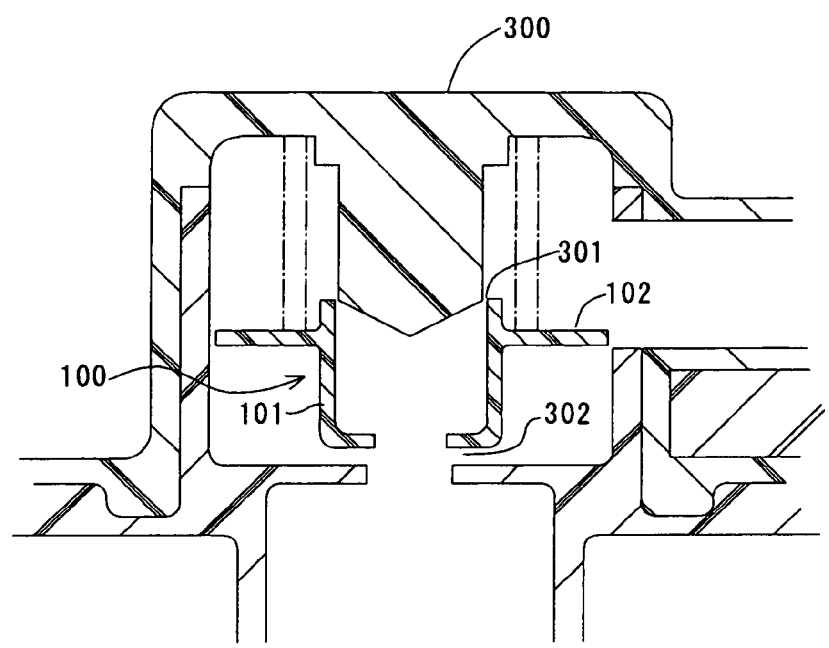
FIG. 14 is another enlarged cross-sectional view for illustrating the major part of the conventional variable flow valve.
Figure 15:
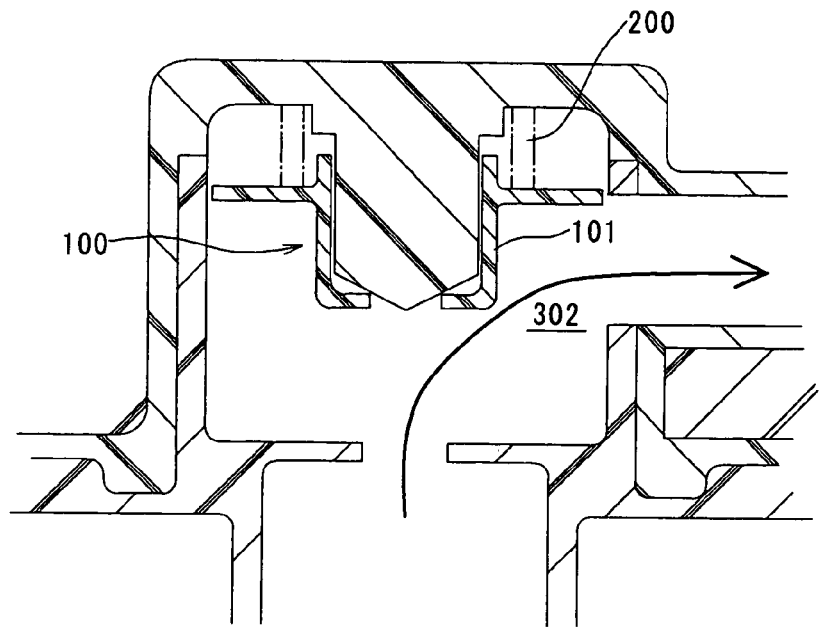
FIG. 15 is still another enlarged cross-sectional view for illustrating the major part of the conventional variable flow valve.

As shown with the solid lines in FIG. 12, there arises the time difference between the change of fuel-tank internal pressure and the change of filler-pipe inner liquid level. As a result, there occurs such a phenomenon that the change of filler-pipe inner liquid level is retarded with respect to the change of fuel-tank internal pressure. In the valve assembly according to Comparative Example, when downsizing the low-pressure-opening valve 500, the flow-passage cross-sectional area has diminished. Accordingly, the valve assembly according to Comparative Example exhibits an increased ventilation pressure resistance. Consequently, the valve assembly according to Comparative Example is less likely to decrease the fuel tank's internal pressure. Moreover, in the valve assembly according to Comparative Example, the filler-pipe inner liquid level has risen up to "$h_2$" as shown in the drawing even after automatically stopping a fuel supply gun. Therefore, depending on the circumstances, there is a fear that the valve assembly according to Comparative Example might let a liquid fuel spout out of a fuel supply opening.

On the contrary, in the valve assembly according to Example No. 5 of the present invention, the increasing fuel-tank inner pressure raises the filler-pipe inner liquid level to "$h_1$" to automatically stop a fuel supply gun. That is, the valve element 4, which makes the valve assembly according to Example No. 5, can quickly decrease fuel-tank inner pressure without ever increasing the ventilation pressure resistance of the valve assembly according to Example No. 5. Therefore, the valve assembly according to Example No. 5 can securely inhibit a liquid fuel from spouting out of a fuel supply opening.

In the valve assembly according to Example No. 5 of the present invention, note that the present variable flow valve is disposed at the top of a cut-off valve so that the valve element 4 moves in the up/down direction. However, as far as the present variable flow valve is disposed in the bent flow passage between cut-off valve and canister, that is, even if the valve element 4 moves horizontally, the present variable flow valve can operate and produce advantages in the same manner as the valve assembly according to Example No. 5 wherever the disposed position may be.

Having now fully described the present invention, it will be apparent to one of ordinary skill in the art that many changes and modifications can be made thereto without departing from the spirit or scope of the present invention as set forth herein including the appended claims.

What is claimed is:

1. A variable flow valve, comprising:
  a housing having an inlet opening through which a fluid flows into the housing, and an outlet opening through which the fluid, which has entered the housing through the inlet opening, flows out to the outside;
  a valve element disposed movably in the housing;
  means for urging the valve element toward the inlet opening;
  a first valve formed by the valve element and a protrusion; and
  a second valve formed by the valve element and the housing, wherein
  the first valve closes communication between the inlet opening and the outlet opening as the valve element moves away from the inlet opening,
  the second valve opens communication between the inlet opening and the outlet opening as the valve element moves away from the inlet opening;
  the first valve is opened and the second valve is closed when a fluid pressure on the inlet opening side is a first predetermined value or less;
  the second valve opens communication between the inlet opening and the outlet opening instantaneously when a differential pressure between an inlet-opening-side fluid pressure and an outlet-opening-side fluid pressure is more than a second predetermined value;
  a central axis of the inlet opening and a central axis of the outlet opening cross each other;
  the valve element includes:
    a separator wall, which separates the inlet opening and the outlet opening; and
    a guide flow passage, which is disposed on an inlet-opening side of the separator wall and connects the inlet opening with the outlet opening when the separator wall moves to open communication between the inlet opening and the outlet opening,
    a cylinder-shaped portion formed on the inlet-opening side of the separator wall, wherein the cylinder-shaped portion includes a side wall; and
    an opening formed in the side wall of the cylinder-shaped portion, wherein the opening is exposed to the outlet opening when the valve element moves away from the inlet opening, thereby forming the guide flow passage between the opening and the inside of the cylinder-shaped portion.

2. The variable flow valve according to claim 1, wherein:
  the valve element and the housing comprise a rotation inhibitor, which inhibits the valve element from rotating.

3. The variable flow valve according to claim 1, wherein:
  the guide flow passage comprises a guide surface, which extends smoothly from the inlet opening to the outlet opening.

4. The variable flow valve according to claim 1, wherein:
  the guide surface of the guide flow passage comprises a flattened section, which is formed in succession to the opening of the valve element.

5. The variable flow valve according to claim 1, wherein:
  the separator wall of the valve element comprises a communicating portion, which communicates spaces, which are disposed on both sides of the separator wall, with each other at least when the second valve is opened.

6. The variable flow valve according to claim 1, wherein the housing includes the protrusion that protrudes toward the inlet opening.

7. The variable flow valve according to claim 6, wherein the valve element has a shape that conforms to an inner shape or an outer shape of the protrusion.

8. The variable flow valve according to claim 7, wherein a small hole is formed in a peripheral wall of the valve element.

9. The variable flow valve according to claim 1, wherein a small hole is formed in a peripheral wall of the valve element.

* * * * *